July 13, 1948.  H. J. KURTZ  2,444,935
APPARATUS FOR MEASURING SHORT TIME INTERVALS
Filed Oct. 31, 1944  2 Sheets—Sheet 1

Inventor
Henry J. Kurtz
By
Attorneys

Patented July 13, 1948

2,444,935

UNITED STATES PATENT OFFICE 2,444,935

APPARATUS FOR MEASURING SHORT TIME INTERVALS

Henry J. Kurtz, Terrace Park, Ohio

Application October 31, 1944, Serial No. 561,249

2 Claims. (Cl. 175—381)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to a method and apparatus for measuring short time intervals, but more particularly to a method and apparatus for measuring the velocity of wave transmission through concrete.

One object of the invention is to provide a simple, inexpensive and accurate method and apparatus for measuring short time intervals.

Another object of the invention is to provide a means for measuring the velocity of wave transmission in concrete or other elastic solids.

A further object of the invention is to provide a means of determining the modulus of elasticity of concrete or other elastic solids, as it is well known that the velocity of wave transmission in an elastic solid has a definite relationship to the modulus of elasticity thereof.

In the accompanying drawings which form part of the instant specification and are to be used in conjunction therewith, and in which like reference numerals are used to indicate like parts:

Briefly stated the electronic interval timer which is designed to accurately measure time intervals of the order of 1/100,000 second or shorter consists of (a) two similar wave-impulse-sensitive units which will generate voltages when actuated by a wave impulse; (b) two similar voltage amplifier units which amplify the voltages generated by the wave-impulse-sensitive units; (c) two similar grid-controlled electron tubes, the grids of which function before the plate currents of the tubes begin to flow, but not after; (d) an electron tube that can be operated in such a way that its plate current remains approximately constant while a large change occurs in the plate voltage; (e) a ballistic meter suitable for measuring the number of coulombs of electricity that flow during a short time interval, through an electrical circuit; (f) a direct current milliammeter; (g) suitable power supplies for the above-mentioned electron tubes; (h) resistances, condensers, and switches for suitable control of the parts.

Figure 1:
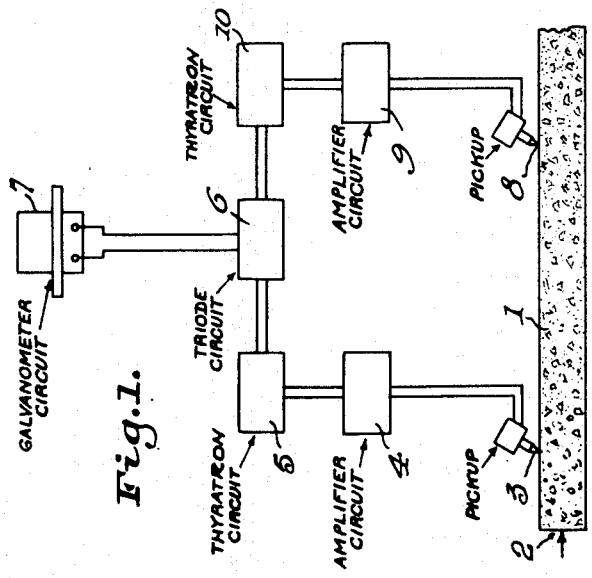
Figure 1 is a schematic drawing showing the general arrangement of the pick-ups, amplifier and other tube circuits.
Figure 2:
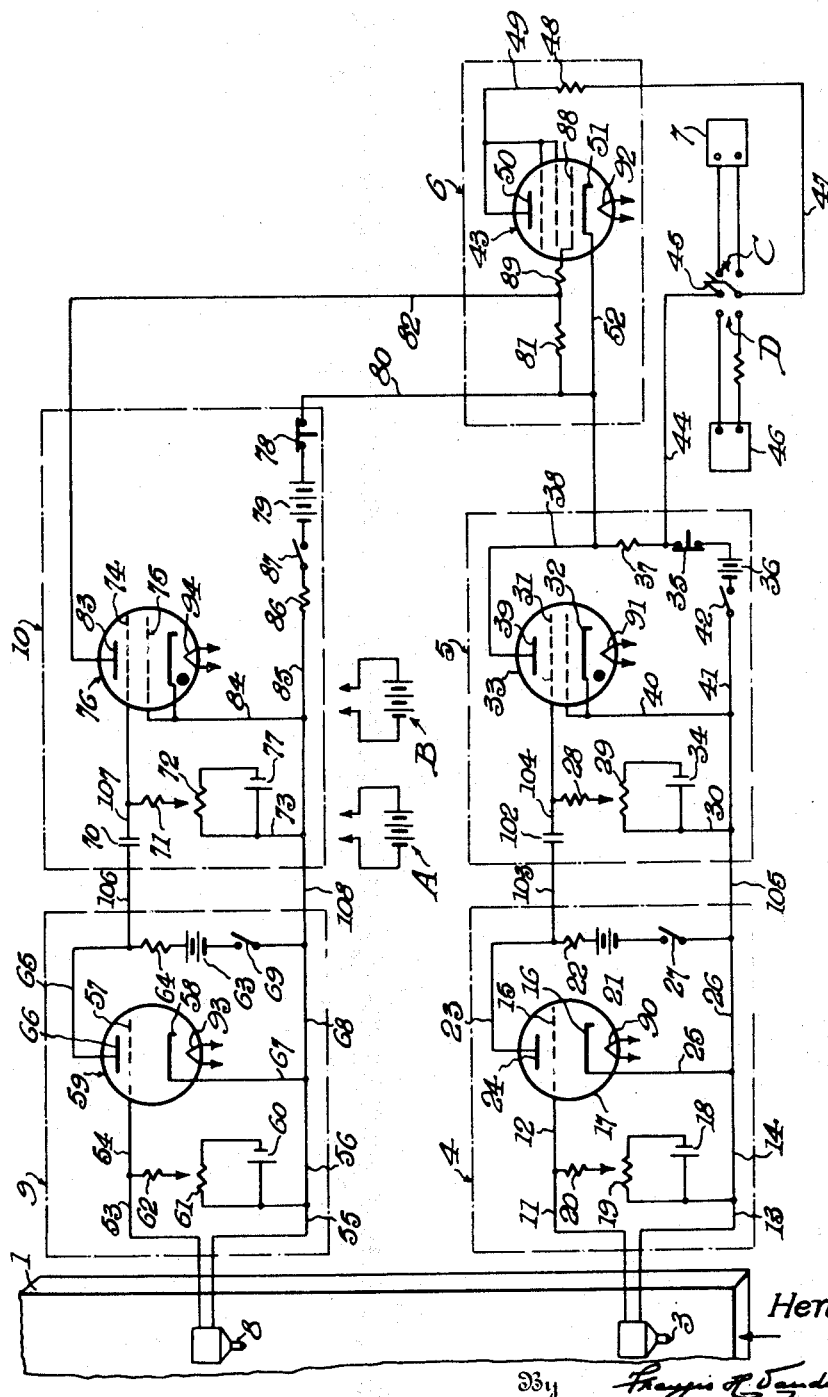
Figure 2 is a detailed wiring diagram explanatory of the functioning of the individual parts of the apparatus.

The schematic diagram and detailed wiring diagram shown in Figs. 1 and 2 present a general outline of the apparatus as used in the measurement of longitudinal wave velocity in concrete. The test procedure follows. An impact (hammer blow or other) is applied to the (concrete) material under investigation in a horizontal direction initiating a wave impulse which actuates the initial pickup 3 and then the final pickup 8, as the wave travels through the (concrete) material. The voltage generated in pickup 3 is amplified in amplifier circuit 4. The output of amplifier circuit 4 serves to make the grid-bias voltage of thyratron tube 33 less negative thereby causing ionization in the tube. The flow of current through the load resistance of thyratron 33, applies a plate-to-cathode voltage to the triode tube 43. The values of plate voltage and grid voltage of the triode are so selected as to obtain a flat plate voltage-plate current characteristic for a wide variation of plate voltage. This stable plate current flows through a series circuit containing a ballistic galvonometer 7. Pickup 8, amplifier circuit 9, and thyratron 76, function in a manner similar to that of the corresponding units connected to pickup 3 except that the plate current of thyratron 76 flows through a biasing resistance in the grid circuit of the triode tube 43. The voltage drop across this biasing resistance serves to bias the triode below cut-off, reducing the current through the ballistic galvanometer 7 to zero. The effects of the wave impulse then are, (a) to start the flow of a constant current through the ballistic galvanometer 7 when the impulse actuates pickup 3, and (b) to stop the flow of this current when the impulse actuates pickup 8. The normal current is measured by deionizing thyratron 76, ionizing thyratron 33, and operating a double-pole, double-throw switch 45 in the plate circuit of the triode 43 which changes the path of the current through the galvanometer 7 to that of the milliammeter 46. The resistance of the milliammeter circuit is the same as that of the galvanometer circuit.

Referring now to Figure 1, the numeral 1 indicates a concrete body which transmits a wave impulse initiated by an impact, such as a hammer blow, at the location indicated by the numeral 2. The impact at 2 is approximately in line with pickup 3 and pickup 8. The wave traveling through the concrete 1, generates a voltage in vibration sensitive pickup 3. The voltage is amplified in amplifier 4, which in turn ionizes thyratron tube 33 in thyratron tube circuit 5, which in turn initiates a direct current through triode tube circuit 6 and ballistic galvanometer 7.

The wave traveling through the concrete body 1 also generates a voltage in vibration sensitive pickup 8. This voltage is amplified in amplifier 9, which in turn ionizes thyratron 76 in thyratron tube circuit 10, which in turn, stops the current through triode tube 43 of the tube circuit

6 and ballistic galvanometer 7. The current flows through the ballistic galvanometer 7 only during the time interval when the wave is traveling from pickup 3 to pickup 8. This time interval can now be computed from the value of distance between pickup 3 and pickup 8, the value of current through ballistic galvanometer 7, and the ballistic galvanometer constant.

Referring now to Figure 2, vibration pickups 3 and 8 are of the standard crystal type and contain piezoelectric crystals which exhibit a phenomenon whereby mechanical strains produce opposite electrical charges on different faces of the crystals.

The wave which travels through the concrete 1, resulting from the impact at point 2 is received by the strain-sensitive piezo-electric crystal of pickup 3 whereupon a voltage is produced across conductors 11—12 and 13—14 which in turn apply a voltage between grid 15 and cathode 16 of thermionic tube 17.

It is well known in the art that the sensitivity of thermionic tubes, or amount of amplification, may be controlled by the adjustment of the direct current voltage upon the grid. The voltage applied to grid 15 from battery 18 through potentiometer 19 controls the amplification of tube 17 according to the adjustment of potentiometer 19.

The resistance 20, together with the portion of potentiometer 19 in series with resistance 20 between conductors 11 and 13, serves as load resistance of pickup 3.

The plate current flows from the positive terminal of battery 21 through load resistance 22 through conductor 23 to plate 24 of tube 17, to cathode 16, through conductor 25—26, through switch 27 to the negative terminal of battery 21. A change of voltage on grid 15 due to a wave impulse actuating pickup 3 will cause a change in plate current of tube 17 in sympathy therewith. This change in plate current causes a change in voltage drop across resistance 22. This change in voltage drop is effective across the series circuit consisting of the conductor 103, condenser 102, conductor 104, resistance 28, the portion of potentiometer 29 which is in series with resistance 28, conductor 30, and conductor 105. The series circuit was so selected that a large portion of the total change in said voltage drop appears across the two resistances 28 and said portion of potentiometer 29, and therefore is effective between grid 31 and cathode 32 of thyratron tube 33.

The thyratron tube 33 is a gas-filled tube, the ionization of which is controlled by suitable grid voltage applied between grid 31 and cathode 32 by battery 34 and potentiometer 29. After ionization occurs any voltage applied to grid 31 does not influence the flow of plate current through tube 33; and deionization and restoration of grid control is accomplished by opening the plate circuit by operating contactor 35. The normal position of contactor 35 is closed.

The plate current, initiated by said change in voltage drop applied to grid 31, flows from the positive terminal of battery 36 through contractor 35, through load resistance 37, through conductor 38 to plate 39 of tube 33, to cathode 32, through conductors 40 and 41, through switch 42, to the negative terminal of battery 36. When the plate current is flowing a large proportion of the voltage of battery 36 appears as voltage drop across load resistance 37. This voltage drop serves as plate voltage for thermionic tube 43 and is so adjusted that a flat plate voltage-plate current characteristic is realized. This arrangement is advantageous since the plate current of thermionic tube 43 attains its full value before the plate current of thyratron tube 33 reaches its maximum value, thereby insuring an extremely small time-lag between the time the wave impulse actuates pickup 3 and the time the plate current of thermionic tube 43 attains its full value.

The plate current of tube 43 flows from the positive terminal of battery 36 through conductor 44, through switch 45, through ballistic galvanometer 7 when switch 45 is in position C, or through milliammeter 46 when switch 45 is in position D, through conductor 47, through load resistance 48, through conductor 49, to plate 50 of tube 43, to cathode 51, through conductor 52—38 to plate 39 of thyratron 33, to cathode 32, through conductor 40—41, through switch 42, to the negative terminal of battery 36.

When the wave impulse initiated by the impact at the point 2 reaches pickup 8 a voltage is produced across conductors 53—54 and 55—56 which in turn applies a voltage between grid 57 and cathode 58 of thermionic tube 59.

The voltage applied to grid 57 from battery 60 through potentiometer 61 controls the amplification of tube 59 according to the adjustment of potentiometer 61.

The resistance 62, together with the portion of potentiometer 61 in series with resistance 62 between conductors 53 and 55, serves as load resistance of pickup 8.

The plate current flows from the positive terminal of battery 63, through load resistance 64, through conductor 65, to plate 66 of tube 59, to cathode 58, through conductor 67—68, through switch 69, to the negative terminal of battery 63. A change of voltage on grid 57, due to a wave impulse actuating pickup 8, will cause a change in plate current of tube 59 in sympathy therewith. This change in plate current causes a change in voltage drop across resistance 64. This change in voltage drop is effective across the series circuit consisting of conductor 106—107, condenser 70, resistance 71, the portion of potentiometer 72 which is in series with resistance 71, conductor 73, and conductor 108. The series circuit was so selected that a large proportion of the total change in said voltage drop appears across the two resistances 71 and said portion of potentiometer 72, and therefore is effective between grid 74 and cathode 75 of thyratron tube 76.

The thyratron tube 76 is a gas-filled tube, the ionization of which is controlled by suitable grid voltage applied between grid 74 and cathode 75 by battery 77 and potentiometer 72. After ionization occurs any voltage applied to grid 74 does not influence the flow of plate current through tube 76; and deionization and restoration of grid control is accomplished by opening the plate circuit of operating contactor 78 which is normally closed.

The plate current initiated by said change in voltage drop as applied to grid 74, flows from the positive terminal of battery 79 through contactor 78, through conductor 80, through resistance 81, through conductor 82, to plate 83 of tube 76, to cathode 75 through conductor 84—85, through load resistance 86, through switch 87 to the negative terminal of battery 79. This plate current causes a voltage drop across resistance 81. Said voltage drop is applied to grid 88 of tube 43 through grid resistance 89 and serves to reduce the plate current of tube 43 to zero. Said voltage is considerably greater than the cut-off voltage of tube 43. This arrangement is advantageous since the plate current of tube 43 is reduced to zero before the plate current of thyratron tube 76 reaches its maximum value, thereby insuring an extremely small time-lag between the time the wave impulse actuates pickup 8 and the time the plate current of tube 43 is reduced to zero.

The value of plate current of tube 43, Figure 2, is measured by operating switch 45 to position D, and applying an impact to pickup 3.

The filament battery A, Figure 2, is provided for heating filament 90 of tube 17, filament 91 of tube 33, and filament 92 of tube 43, and the filament battery B is provided for heating filament 93 of tube 59 and filament 94 of tube 76. The filament circuits of the tubes are not shown.

Figure 3:
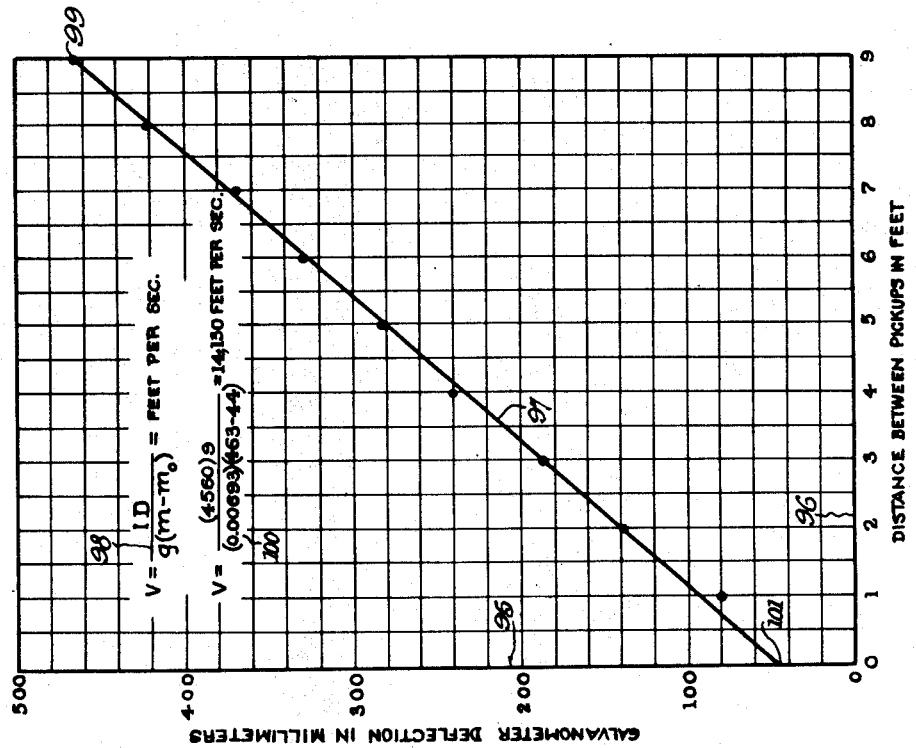
Figure 3 is a graph explanatory of the method used in the determination of velocity of wave transmission through concrete.

Referring now to Figure 3, there is depicted a graph of test values of galvanometer deflection in millimeters plotted as ordinates 95 versus distance between pickups in feet plotted as abscissa 96. These test values were obtained by using the apparatus represented in Figure 2 with the distances between pickup 3 and pickup 8 varying in increments of one foot, from one foot to nine feet inclusive. The straight line 97 represents the trend of the test values. The value of velocity is computed from the following formula:

$$V = \frac{ID}{g(m-m_0)} = \text{feet per sec.}$$

in which $V$ = velocity in feet per sec.
$I$ = current in microamperes as measured by milliammeter 46, Fig. 2.
$D$ and $m$ = coordinates of point 99, Fig. 3.
$D$ = distance between pickup 3 and pickup 8, Fig. 2.
$m$ = deflection in millimeters of galvanometer 7, Fig. 2.
$g$ = a galvanometer constant in microcoulombs per millimeter. A value supplied by the manufacturer or by special calibration.
$m_0$ = the ordinate intercept in millimeters of line 97, shown at 101, Fig. 3.

Substituting determined values in the above formula as follows:

$$V = \frac{(4560)9}{(0.00693)(463-44)} = 14,130 \text{ feet per sec.}$$

The use of said ordinate intercept in the formula eliminates the necessity of adjusting the time-constant of circuit 3—4—5—6, Figure 1, to precisely the same value as that of circuit 8—9—10—6, Figure 1.

Having thus described my invention, what I claim as new and wish to secure by Letters Patent is:

1. An apparatus for measuring the time interval required for an impulse wave to travel a measured distance in a selected medium comprising similar initial and final wave impulse sensitive units, each unit including a wave responsive pick-up, an amplifying system and a thyratron system including a thyratron provided with input and output circuits, the input circuit being coupled to said pick-up through the amplifying system, a control system having a circuit coupled to both units, said control system being provided with an electronic tube adapted to maintain a constant plate current regardless of change in plate voltage, said tube including plate and grid circuits, said plate circuit being coupled through a biasing resistance to the plate circuit of the thyratron of the initial unit whereby to start a uniform flow of current in the plate circuit of the electronic tube of the control system with energization of the initial pick-up and the consequent firing of the thyratron by effecting a change in plate potential and said grid circuit of the electronic device of the control system being coupled through a second biasing resistance to the plate circuit of the thyratron of the final unit whereby to stop the uniform flow of current in the grid circuit of the electronic device with energization of the final pick-up, and metering means connected with the control system for determining the quantity and rate of flow in the plate circuit of said electronic tube during said interval.

2. An apparatus for measuring the time interval required for an impulse wave to travel a measured distance in a selected medium comprising initial and final impulse units having output circuits, each unit including a wave responsive pick-up adapted to generate voltages when actuated by a wave impulse, initial and final similar amplifying circuits each including a thermionic tube, coupled respectively to said initial and final wave impulse units and adapted to amplify the voltages generated by said units, similar initial and final circuits each including a grid controlled thyratron, said circuits being coupled respectively to said initial and final amplifying circuits, a control system provided with a control tube having a control circuit coupled to the plate circuit of each of the thyratrons and adapted to maintain constant current regardless of plate voltage, one of said plate control circuits being coupled through a biasing resistance to the plate circuit of the thyratron of the initial impulse unit whereby to start a uniform flow of current in the plate circuit of said control system with energization of the initial pick-up, the second plate circuit of said control system being coupled through a second biasing resistance within the output circuit of the thyratron of the final unit whereby energization of the pick-up of the final unit effects a voltage drop across said second biasing resistance and the reduction of current flow within the control system to zero, and metering means connected with the control system for determining the quantity and rate of flow in the plate circuit of said control system during said interval.

HENRY J. KURTZ.

REFERENCES CITED

The following references are of record in the file of this patent:

UNITED STATES PATENTS

| Number | Name | Date |
|---|---|---|
| 1,526,337 | Hartley | Feb. 17, 1925 |
| 2,012,837 | Tear | Aug. 27, 1935 |
| 2,131,993 | Wittkuhns et al. | Oct. 4, 1938 |
| 2,261,010 | Weiss | Oct. 28, 1941 |
| 2,301,195 | Bradford | Nov. 10, 1942 |

FOREIGN PATENTS

| Number | Country | Date |
|---|---|---|
| 181,665 | Switzerland | Dec. 31, 1935 |
| 230,013 | Great Britain | Mar. 2, 1926 |
| 469,417 | Great Britain | July 26, 1937 |